June 11, 1968 R. WYLLIE ETAL 3,387,323
MOLD WITH CORE HAVING THREAD FORMING PORTIONS
Filed March 14, 1966 3 Sheets-Sheet 1

INVENTORS
ROBERT WYLLIE
JAMES F. ROPES
BY
M. A. Hobbs
ATTORNEY

INVENTORS
ROBERT WYLLIE
JAMES F. ROPES
BY
M. A. Hobbs
ATTORNEY

June 11, 1968   R. WYLLIE ET AL   3,387,323
MOLD WITH CORE HAVING THREAD FORMING PORTIONS
Filed March 14, 1966   3 Sheets-Sheet 3
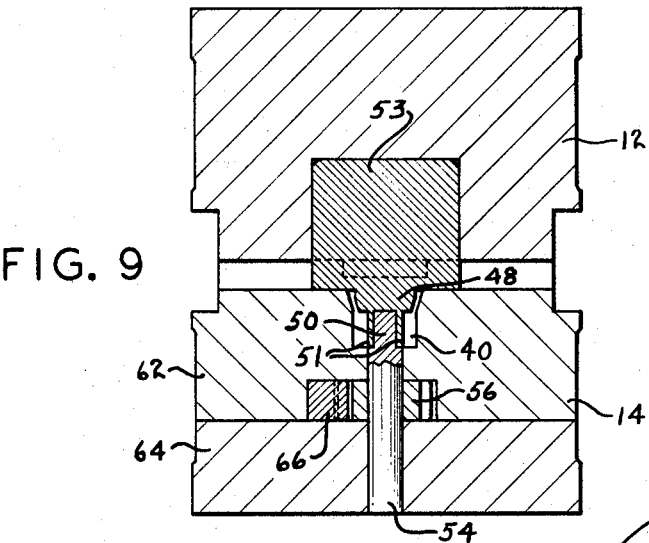
FIG. 9
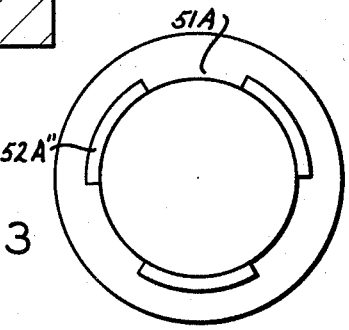
FIG. 13
FIG. 10
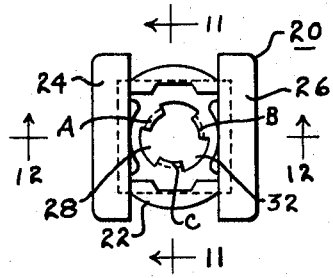
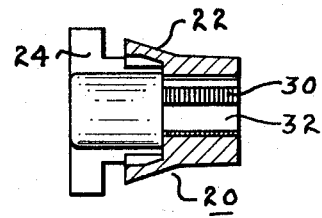
FIG. 12
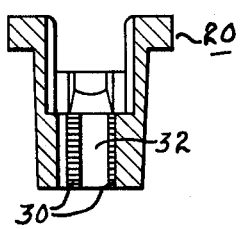
FIG. 11
INVENTORS
ROBERT WYLLIE
JAMES F. ROPES
BY M. A. Hobbs
ATTORNEY United States Patent Office 3,387,323
Patented June 11, 1968

3,387,323
MOLD WITH CORE HAVING THREAD
FORMING PORTIONS
Robert Wyllie and James F. Ropes, South Bend, Ind., assignors to Nyloncraft, Inc., Mishawaka, Ind., a corporation of Indiana
Filed Mar. 14, 1966, Ser. No. 533,958
10 Claims. (Cl. 18—2)

ABSTRACT OF THE DISCLOSURE

A mold for producing articles having internal screw threads, consisting of two principal sections movable axially from one another and having core parts in the mold cavities which are rotated relative to one another in order to release the threaded articles produced in the mold. One of the relatively movable core parts contains spaced threaded portions and the other core part contains filler members disposed between the threaded portions of the first core part.

---

In recent years molded plastic articles have replaced many articles made of machined metal, thus resulting in a substantial decrease in the cost of the article. For many purposes the plastic articles serve the purpose as well as the same articles made of metal; however, the molding operation, while being responsible for decreased cost of the article, has had certain limitations on design and features which prevent the products from being made of plastic or which have substantially increased the otherwise relatively low cost of the articles. This situation is particularly serious with respect to articles having internal screw threads which normally must be cut in the hollow interior of the article as an independent operation after molding or must be produced in complicated, multiple section, and hence expensive, cores. It is therefore one of the principal objects of the present invention to provide a mold for producing articles having bores or cavities with internal screw threaded surfaces, which is relatively simple in construction and operation and which uses a core adapted to be easily and quickly withdrawn from the molded articles immediately upon completion of the molding operation.

Another object of the invention is to provide a mold for forming plastic articles with internal screw threads which operates automatically to position the core for forming the threads and to remove the core from the newly formed articles as the mold is opened after completion of the molding operation.

Still another object of the invention is to provide a relatively simple, easily assembled and operated mold of the aforesaid type, which can readily be adapted to a variety of different types and shapes of products having cavities or bores with internal screw threads and from which the products can be quickly and easily removed upon completion of the molding operation.

Further objects and advantages of the invention will become apparent from the following description and accompanying drawings, wherein:

FIGURE 9 is a vertical cross sectional view of the mold, the section being taken on line 9—9 of FIGURE 5;

FIGURE 10 is a top plan view of one type of article produced in the present mold;

FIGURE 11 is a cross sectional view of the article shown in FIGURE 10, the section being taken on line 11—11;

FIGURE 12 is a cross sectional view of the article shown in FIGURE 10, the section being taken on line 12—12; and FIGURE 13 is an enlarged plan view of the lower core section.

Figure 1:
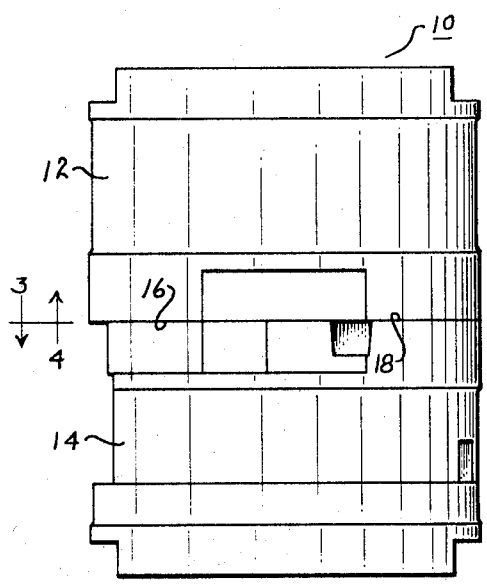
FIGURE 1 is a front elevational view of the present mold of the single cavity type.
Figure 2:
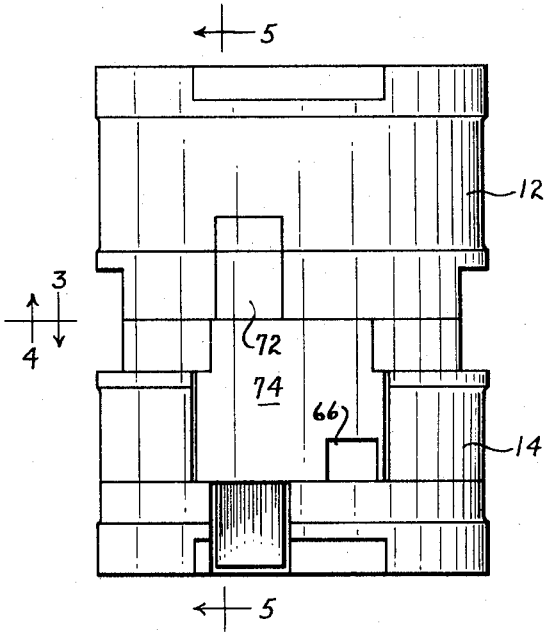
FIGURE 2 is a side elevational view of the mold shown in FIGURE 1.
Figure 3:
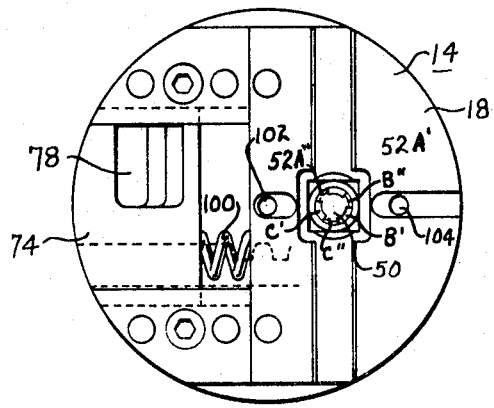
FIGURE 3 is a top plan view of the lower mold section, the upper surface of the lower mold section being on line 3—3 in FIGURE 1.
Figure 4:
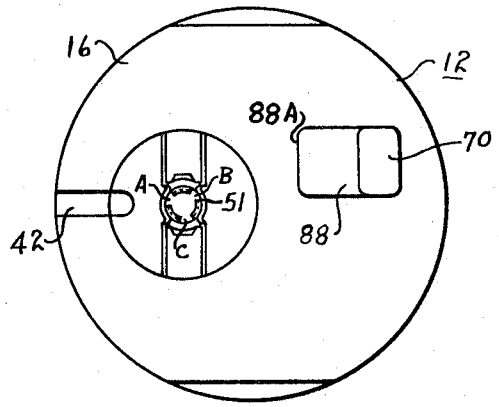
FIGURE 4 is a bottom view of the upper mold section, the lower surface of the upper mold section being on line 4—4 in FIGURE 1.

Referring more specifically to the drawings, the present mold, generally indicated by numeral 10, consists of an upper section 12 and a lower section 14 having, respectively, lower and upper faces 16 and 18 seating firmly in face-to-face contact when the mold is closed. The upper mold section is mounted on or secured to the ram platen and the lower mold section to the bottom platen, the former normally reciprocating to and from the latter as the ram platens open and close the mold. While the present mold is shown as a single cavity unit, the present concept can readily be embodied in a multiple cavity mold.

To better illustrate the operation of the present mold, an article 20, consisting of a fixture for a drapery rod or the like, is shown in FIGURES 10 through 12, and consists of a body 22, flanges 24 and 26, and a bore 28 having side walls with a plurality of thread segments 30A, B and C separated by intervening spaces 32. The screw thread segments A, B and C together form a complete screw thread unit for receiving a threaded rod or bolt of continuous threads which interlock with the three threaded segments. The mold cavity 40 for producing articles, such as the fixture illustrated in FIGURES 10, 11 and 12, is disposed in the upper part of lower mold section 14, and is fed raw plastic material through sprue 42 connected to the mold cavity by passages 44 and 46 at the upper peripheral edges thereof.

A core consists of an upper section 48 and a lower section 50 and extends vertically through the mold cavity with the two sections in face-to-face contact with one another. The upper core section has three extensions identified by numerals 51A, B and C seating in longitudinally positioned slots 52A', B' and C' in the lower core section and interlocking with thread segment portions 52A", B" and C" of the lower section. Upper core section 48 is formed integrally with core insert 53, which in turn is rigidly secured in the lower portion of upper mold section 12 and moves therewith to and from the lower core section, the upper core section being tapered in order to permit easy withdrawal from article 20. The lower core section 50 is cylindrical in shape and is provided with the three thread segment portions A", B" and C" corresponding to and forming the thread segments 30 on article 20. The three thread segment portions of the lower core section 50 are formed integrally with the upper end of a rotatable shaft 54 journalled in the lower portion of mold section 14 and held against axial movement by a gear 56 secured to the shaft by a pin 58 extending through the gear and shaft. The gear is seated in a cylindrical recess 60 in the bottom of portion 62 of the lower mold section and rests on the upper surface of portion 64 of the lower mold section.

Figure 6:
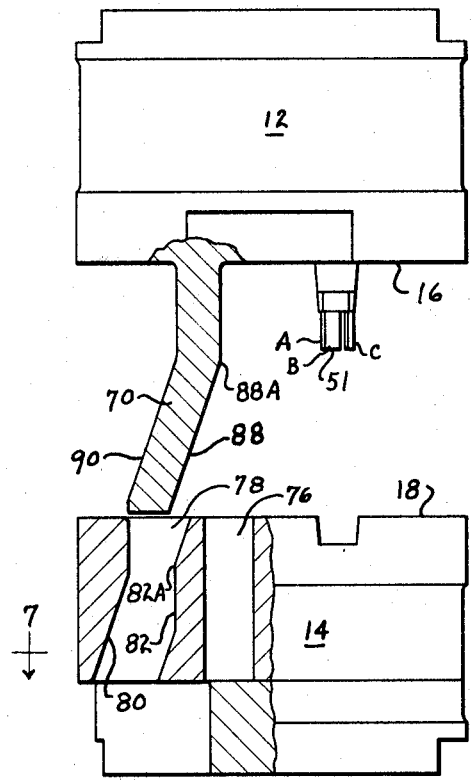
FIGURE 6 is a partial cross sectional and elevational view of the mold with the sections withdrawn from one another to better illustrate the manner in which the mold is operated.

The lower core section 50, shaft 54 and gear 56 are rotated by a rack 66 seated in a groove 68 in the lower part of portion 62 and moved longitudinally for rotating the core section 50 by an actuating arm 70 which is connected rigidly to insert 72 of the upper mold section 12 and which moves in unison with the upper mold section as the section is advanced and retracted from the lower mold section. To translate the longitudinal movement into the transverse movement, arm 70 extends into and engages a cam block 74 seated in slot 76 of portion 62, the cam block being provided with a slot 78 of rectangular cross section having contoured side walls 80 and 82 for cooperating with the special configuration of arm 70. Rack 66 is rigidly secured to the block by pins 84 and 86 and moves with the block as the arm moves into and out of slot 78. As arm 70 advances, the lower end thereof enters slot 78 and side wall 88 engages surface 82, and since wall 88 is angular with respect to surface 82, the block is moved from left to right, as seen in FIGURE 6, from the position shown in FIGURE 7 to the position shown in FIGURE 8, thereby advancing the rack and rotating gear 56, shaft 54 and lower core section 50 sufficiently to align the thread segment portions of the lower core section with the space formed by extensions 51A, B and C of the upper core section when the mold has been fully closed. With the cores in this interlocking position, the threaded segments of the core constitute one wall of vertical channels spaced around the core for forming threaded ribs 30 of fixture 20.

Figure 5:
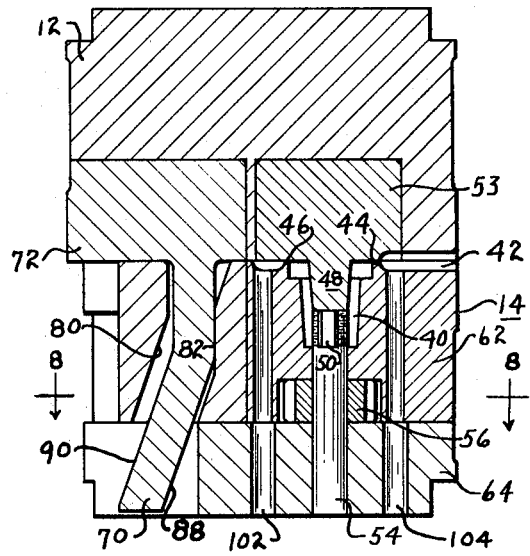
FIGURE 5 is a vertical cross sectional view of the mold shown in FIGURES 1 and 2, the section being taken on line 5—5 of FIGURE 2.
Figure 8:
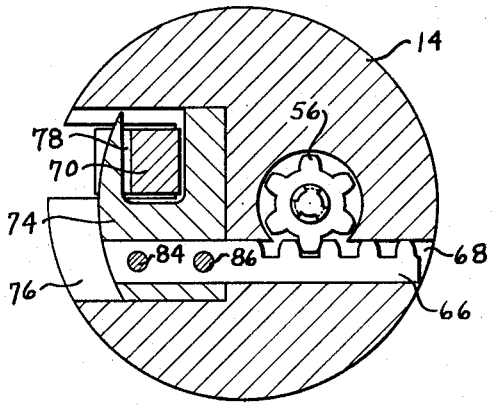
FIGURE 8 is another horizontal cross sectional view of the mold section, the section being taken on line 8—8 of FIGURE 5 and being taken on the same plane of the lower mold section as FIGURE 7.
Figure 7:
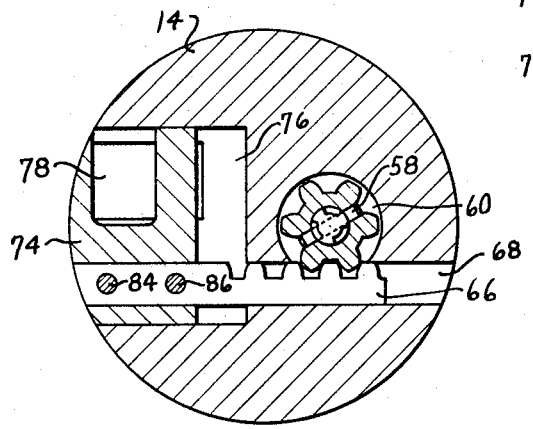
FIGURE 7 is a horizontal cross sectional view of the lower mold section, taken on line 7—7 of FIGURE 6.

After the mold has been opened, i.e., the upper section 12 has been withdrawn from the lower section 14, sufficiently to disengage extensions 51A, B and C from the lower core section, surface 90 on arm 70 engages tapered angular side wall 80, and as the arm further advances outwardly, block 74 is retracted from the position shown in FIGURE 8 to the position shown in FIGURE 7, thereby moving rack 66 to the left, which rotates gear 56, shaft 54 and lower core section 50 sufficiently to align thread segment portions 52A″, B″ and C″ with the channels in article 20 formed by extensions 51A, B and C. The arm 70 and slot 78 of block 74 are so contoured that the initial parting movement between the upper and lower mold sections does not produce a retracting action on the block, and hence does not cause rack 66 to rotate gear 56, shaft 54 and lower core section 50 until extensions 51A, B and C of the upper core section 48 have been fully disengaged from the lower core section. It is seen from FIGURE 5 that surface 90 on arm 70 must move upwardly a substantial distance before it engages the surface 80 on block 74. The relationship between surface 88 and contoured surface 82 determines the degree of rotation of the lower core section. As an alternative, the retraction movement of the block and rack may be controlled by surfaces 82 and 88 of the block and arm by use of coil spring 100 disposed in slot 76 and reacting between the inner end of the block and the bottom of a recess in the adjacent part of portion 62. The spring holds the block and pinion in the fully retracted position until they are positively moved in the direction to rotate the core to its molding position by closing of the mold sections 12 and 14.

A plurality of knock-out pins 102 and 104 are provided for dislodging fixture 20 from cavity 40 and the attached overflow material from sprue 42 and openings 44 and 46. After the article has solidified, the material can be readily removed from the cavity along with the overflow material. The molding process used by and the materials used in the mold are well known and used extensively throughout the trade, and hence will not be described in detail herein. The press in which the mold is used, for the same reason, will not be described herein. The mold is constructed throughout of steel or other suitable metal and the material does not constitute a limitation on the scope of the invention.

In the operation of the present mold, starting with the mold in open position, i.e., with the upper and lower sections separated in the manner illustrated in FIGURE 6 and with block 74 and rack 66 in their retracted positions, as the mold is closed arm 70 advances into slot 78, surface 88 eventually contacting surface 82, causing block 74 and rack 66 to move from left to right, as illustrated in FIGURES 7 and 8. As the rack advances, gear 56 is rotated, rotating shaft 54 and lower core section 50. When the arm has advanced inwardly until point 88A of the arm coincides with point 82A of surface 82, the spaces between the thread segment portions are in alignment with extensions 51A, B and C. Further closing of the mold does not result in further rotation of the lower core section, but permits extensions 51A, B and C to enter the spaces between the thread segment portions until the upper core section has fully seated on the lower core section and the mold has moved to fully closed position. With the mold in closed position, the raw plastic material is injected through sprue 42 and openings 44 and 46 into the mold cavity 40 where it immediately sets, forming a rigid article. As the mold is opened upon completion of the molding operation, block 74 remains in its fully advanced position, retaining the lower core section in its molding position until the upper mold section is withdrawn sufficiently to disengage extensions 51A, B and C of the upper core section from the lower core section. When the opening has advanced sufficiently to permit point 88A to pass over point 82A, block 74 and rack 66 commence to retract, thus rotating the thread segment portions of the lower core section from the molding position to the position previously occupied in the mold by extensions 51A, B and C. Since the molded article remains stationary, i.e., is not rotated with the core, the molded article now is free to be removed from the cavity without any obstructions or resistance from the thread segment portions now occupying the slots produced by extensions 51A, B and C. Thus, the article is readily removed from the mold containing the final screw threads ready for use without any further cutting or machining operations on the article. The mold is now ready to repeat the operation in the manner previously described.

The present mold concept of forming threads on the internal bores and the like on articles may be used on a variety of different articles and with a variety of different plastic materials. Reference to the mold and core sections by the words "upper" and "lower" has been made merely for convenience of description and is not intended to be a limitation, since the mold may be used in any position. While only one embodiment of the present mold has been described herein in detail, various changes and modifications may be made without departing from the scope of the invention.

We claim:

1. A mold for producing articles having internal screw threads, comprising two mold sections, one of said mold sections having a cavity for forming articles, a core for said cavity having two sections, one of said core sections being rotatable and disposed in said cavity and having a plurality of spaced thread segment portions, the other of said core sections being mounted on the other of said mold sections and having a plurality of spaced extensions for filling the space between said thread segment portions of said one core section, said mold sections being movable relative to one another for opening the mold and withdrawing one of said core sections from the other of said core sections, and means for rotating said rotatable core section after said extensions have been retracted from between said thread segment portions.

2. A mold as defined in claim 1, in which said one core section has three thread segment portions extending longitudinally thereon and spaced equally from one another.

3. A mold as defined in claim 2, in which the spaces between the thread segment portions are substantially the same width as said thread segment portions.

4. A mold as defined in claim 3, in which the rotatable core section is held against translatory movement in the mold cavity and the other core section is withdrawn from the cavity when the mold is opened.

5. A mold as defined in claim 4, in which the means for rotating said rotatable core section includes a shaft connected axially thereto, a gear on said shaft, a rack for rotating said gear, a movable block having a cam surface attached to said rack and mounted in the mold section having said cavity, an arm attached to said other mold section and having a cam surface for engaging the cam surface on said block to move said block and rack to rotate said rotatable core section.

6. A mold as defined in claim 5, in which the cam surfaces on the arm and block are so arranged that the core section having the thread segment portions thereon is not rotated until the mold has been partially opened and said core extensions have been withdrawn from between the thread segment portions.

7. A mold as defined in claim 1, in which the means for rotating said rotatable core includes a shaft connected axially thereto, a gear on said shaft, a rack for rotating said gear, a movable block attached to said rack and mounted in the mold section having said cavity, an arm attached to said other mold section and having a cam surface for engaging a cam surface on said block to move said block for rotating said core section having the threaded portions thereon.

8. A mold as defined in claim 1, in which the means for rotating the rotatable core includes an arm on one mold section, and a block on the other mold section, said arm and block being so arranged that the core section having the thread segment portions thereon is not rotated until the mold has been partially opened and said extensions have been withdrawn from between the thread segment portions.

9. The mold as defined in claim 8, in which said block is moved positively in the direction to move said one core section to disengage the thread segment portions from the threads formed in the articles produced in the cavity in the mold.

10. The mold as defined in claim 1 in which said means for rotating said rotatable core section is operated by the movement of the mold sections relative to one another.

References Cited

UNITED STATES PATENTS

| | | | |
|---|---|---|---|
| 132,215 | 10/1872 | Oakman | 249—59 |
| 2,327,665 | 8/1943 | Peat. | |
| 2,391,527 | 12/1945 | Tracy | 18—2 |
| 2,557,918 | 6/1951 | Schmid | 18—2 |
| 2,890,487 | 6/1959 | Morin. | |
| 2,894,284 | 7/1959 | Allison et al. | 18—2 |
| 3,074,113 | 1/1963 | Specht | 18—45 |
| 3,156,008 | 11/1964 | Martin | 18—2 |
| 3,339,242 | 9/1967 | Lamb. | |

J. HOWARD FLINT, JR., *Primary Examiner.*